(12) United States Patent
Nishida et al.

(10) Patent No.: US 7,971,026 B2
(45) Date of Patent: Jun. 28, 2011

(54) INFORMATION PROCESSING APPARATUS AND ACCESS CONTROL METHOD

(75) Inventors: Tsuyoshi Nishida, Akishima (JP); Gen Watanabe, Akishima (JP); Kazuyoshi Kuwahara, Akiruno (JP); Hajime Sonobe, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 605 days.

(21) Appl. No.: 12/075,220

(22) Filed: Mar. 10, 2008

(65) Prior Publication Data
US 2008/0270736 A1 Oct. 30, 2008

(30) Foreign Application Priority Data

Apr. 24, 2007 (JP) ................................ 2007-114316

(51) Int. Cl.
*G06F 12/00* (2006.01)
(52) U.S. Cl. ........................................ 711/203; 718/108
(58) Field of Classification Search .................. 711/203; 718/108
See application file for complete search history.

(56) References Cited

U.S. PATENT DOCUMENTS

| | | | |
|---|---|---|---|
| 4,831,515 A * | 5/1989 | Kamada et al. .............. | 712/217 |
| 4,961,135 A * | 10/1990 | Uchihori ...................... | 711/207 |
| 5,887,182 A | 3/1999 | Kinoshita | |
| 6,591,359 B1 * | 7/2003 | Hass et al. .................... | 712/217 |
| 6,766,435 B1 * | 7/2004 | Aglietti et al. ............... | 711/209 |
| 2002/0169938 A1 * | 11/2002 | Scott et al. .................... | 711/207 |
| 2005/0172087 A1 * | 8/2005 | Klingman ..................... | 711/154 |

FOREIGN PATENT DOCUMENTS

| | | |
|---|---|---|
| JP | 2000-298652 | 10/2000 |
| JP | 2003-345589 | 12/2003 |
| JP | 2006-195598 | 7/2006 |

* cited by examiner

*Primary Examiner* — Hashem Farrokh
(74) *Attorney, Agent, or Firm* — Knobbe, Martens, Olson & Bear, LLP (57) ABSTRACT

According to one embodiment, an information processing apparatus includes a processor including a register file which holds physical registers to which general purpose registers provided by an instruction set architecture are assigned, a virtual register assigning unit which assigns a virtual address in the main memory space to a physical register in the register file based on a request from a program, and records a correspondence between each of the virtual addresses and a corresponding one of the physical registers in a virtual register conversion table, and an access converting unit which determines whether or not a virtual address to be accessed is recorded in the virtual register conversion table managed by the virtual register assigning unit, and executes, when the virtual address is recorded therein, processing of accessing the physical register of which a correspondence to the virtual address is recorded in the virtual register conversion table.

9 Claims, 7 Drawing Sheets

| Index | Effective flag | Virtual address | Physical register number |
|---|---|---|---|
| 0 | 0 | 10137320h | 108 |
| 1 | 1 | 1023F000h | 100 |
| 2 | 1 | 10032030h | 102 |
| 3 | 1 | 10082950h | 105 |

| Index | Effective flag | Virtual address |
|---|---|---|
| 0 (=R8) | 0 | 10137320h |
| 1 (=R9) | 1 | 1023F000h |
| 2 (=R10) | 1 | 10032030h |
| 3 (=R11) | 1 | 10082950h |

INFORMATION PROCESSING APPARATUS AND ACCESS CONTROL METHOD

CROSS-REFERENCE TO RELATED APPLICATIONS

This application is based upon and claims the benefit of priority from Japanese Patent Application No. 2007-114316, filed Apr. 24, 2007, the entire contents of which are incorporated herein by reference.

BACKGROUND

1. Field

One embodiment of the present invention relates to a data access control technique suitably applied to an information processing apparatus such as a personal computer.

2. Description of the Related Art

In recent years, various types of personal computers such as a desktop type and a notebook type are widely spread. Functions required of the personal computers of such types are incessantly sophisticated and, recently, for example, even program data which are scrambled and broadcast can be viewed.

In consideration of these circumstances, various methods for improving the functions of the processor have heretofore been proposed (see, for example, Jpn. Pat. Appln. KOKAI Publication No. 2000-298652). In this Jpn. Pat. Appln. KOKAI Publication No. 2000-298652, a multiprocessor capable of efficiently executing a plurality of processes while preventing the LSI area from becoming large by causing a plurality of processors to use a circuit in common is proposed.

Personal computers of such types are each provided with a virtual storage, and hence data access executed by using a program is executed by using a virtual address. On the other hand, on the system side, a real address is obtained by subjecting the virtual address to address conversion, and address processing is executed for the main storage.

A processor incorporated in the personal computers of such types is provided with a register renaming function. To execute an instruction issued by the program, a general purpose register provided by an instruction set architecture is used. What performs control to dynamically allocate the general purpose register to a physical register in a register file is the register renaming function.

It should be noted that, as compared with processing of access to the main storage, i.e., a memory (outside the processor), processing of access to a physical register (inside the processor) is performed at remarkably high speed. Further, a physical register to which no general purpose register is allocated is turned into a mere surplus resource. Accordingly, by providing a contrivance for replacing processing of access to a memory with processing of access to a physical register, it is possible to effectively utilize resources, and improve the performance of the processor.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes a processor including a register file which holds physical registers to which general purpose registers provided by an instruction set architecture are assigned, a virtual register assigning unit which assigns a virtual address in the main memory space to a physical register in the register file based on a request from a program, and records a correspondence between each of the virtual addresses and a corresponding one of the physical registers in a virtual register conversion table, and an access converting unit which determines whether or not a virtual address to be accessed is recorded in the virtual register conversion table managed by the virtual register assigning unit, and executes, when the virtual address is recorded therein, processing of accessing the physical register of which a correspondence to the virtual address is recorded in the virtual register conversion table.

First Embodiment

Figure 1:
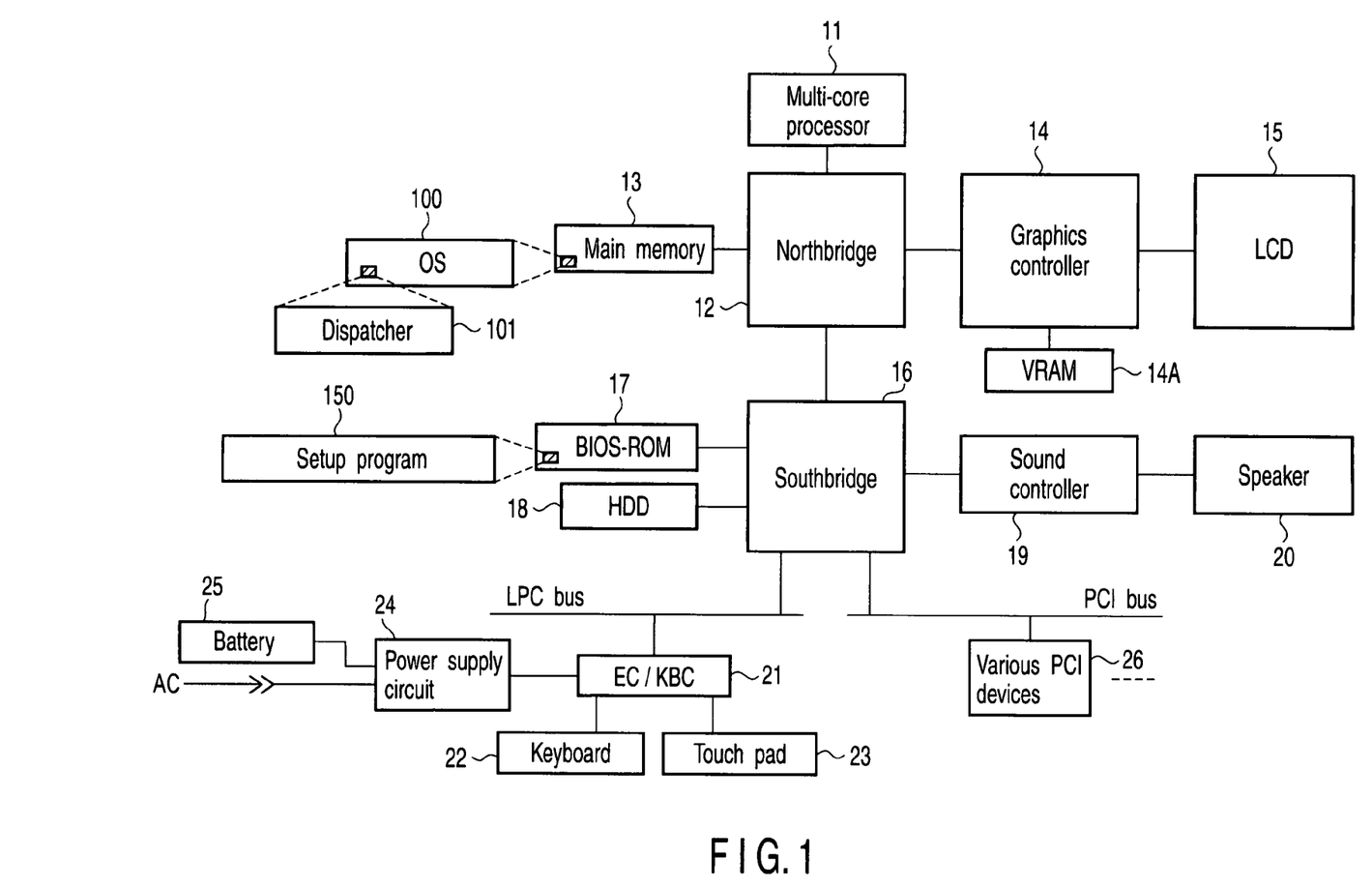
FIG. 1 is an exemplary view showing a configuration of an information processing apparatus (computer) according to a first embodiment of the invention.

FIG. 1 shows an exemplary configuration of an information processing apparatus according to this embodiment. This information processing apparatus is realized as a notebook-sized personal computer or the like which can be battery-powered.

As shown in FIG. 1, this computer includes a multi-core processor 11, northbridge 12, main memory 13, graphics controller 14, VRAM 14A, LCD 15, southbridge 16, BIOS-ROM 17, HDD 18, sound controller 19, speaker 20, embedded controller/keyboard controller (EC/KBC) 21, keyboard 22, touch pad 23, power supply circuit 24, battery 25, various PCI devices 26, and the like.

The multi-core processor 11 is a central processing unit for controlling operations of various parts in the computer, and a plurality of instruction processing sections (cores) are incorporated therein. Incidentally, a data access control method of the present invention to be explained in this embodiment is not limited to a multi-core processor, but can be applied to a single-core processor in which only one core is incorporated.

This multi-core processor 11 executes an operating system (OS) 100 loaded from the HDD 18 into the main memory 13 and various application programs that operate under the control of the OS 100. A dispatcher 101 that performs control of task allocation to each core of the multi-core processor 11 is included in the OS 100. Further, the multi-core processor 11 also executes the BIOS stored in the BIOS-ROM 17. The BIOS is a program for controlling various hardware elements. In the BIOS, a setup program 150 for performing operating environment setting of the computer is included.

The northbridge 12 is a bridge device for connecting a local bus of the multi-core processor 11 and the southbridge 16 to each other. The northbridge 12 is provided with a function of performing communication with the graphics controller 14 through a bus, and a memory controller for access-controlling the main memory 13 is incorporated therein. The graphics controller 14 is a display controller for controlling the LCD 15 used as a display monitor of this computer. The graphics controller 14 generates a display signal to be sent to the LCD 15 from image data written to the VRAM 14A.

The southbridge 16 is a controller for controlling various PCI devices 26 on the PCI bus. Further, the BIOS-ROM 17, HDD 18, and sound controller 19 are directly connected to the southbridge 16, and the southbridge 16 is also provided with a function of controlling these elements. The sound controller 19 is a sound source controller for controlling the speaker 20.

The EC/KBC 21 is a one-chip microcomputer in which an embedded controller for power control, and a keyboard controller for controlling the keyboard 22 and the touch pad 23 are integrated with each other. The EC/KBC 21 controls the supply of power from the battery 25 or an external AC power source to each part in cooperation with the power supply circuit 24.

Figure 2:
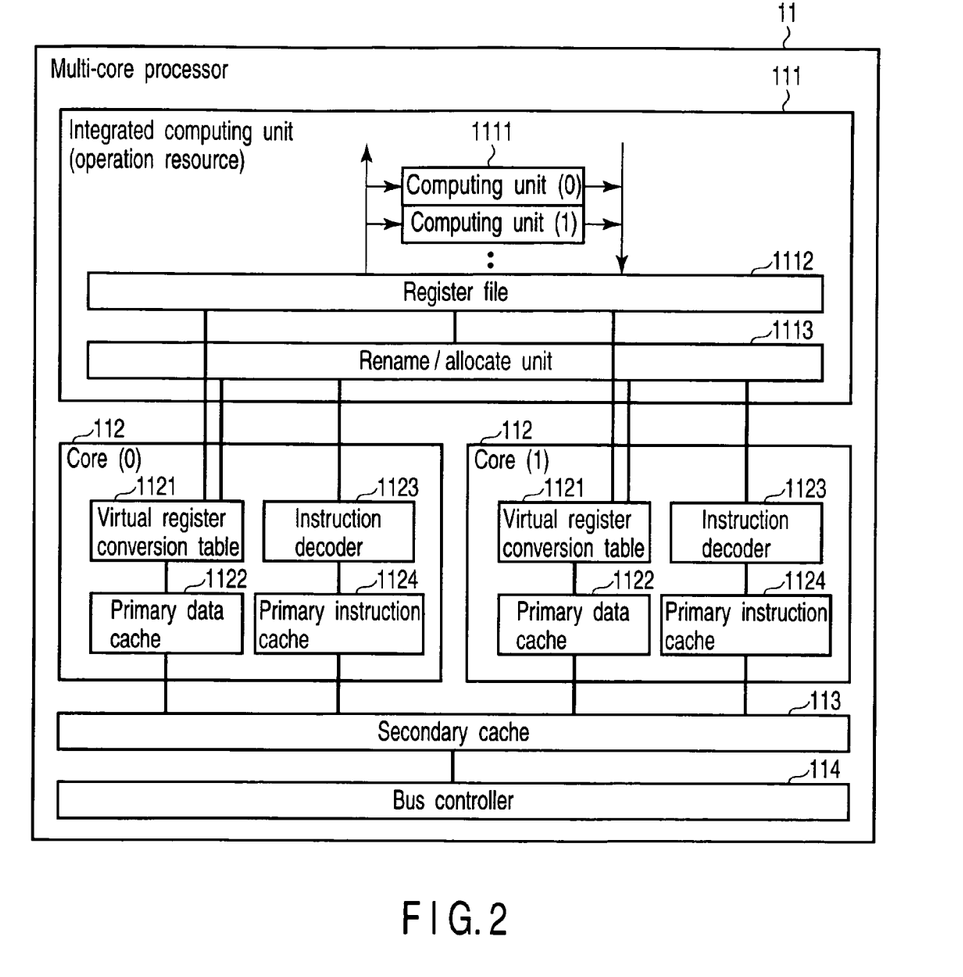
FIG. 2 is an exemplary view showing a configuration of a multi-core processor to be incorporated in the computer of the first embodiment.

FIG. 2 is an exemplary view showing the configuration of the multi-core processor 11. As shown in FIG. 2, the multi-core processor 11 is provided with an integrated computing unit 111, two cores (0, 1) 112, secondary cache 113, bus controller 114, and the like.

In this multi-core processor 11, each core 112 is not provided with an operation resource, and shares the integrated computing unit 111 (which is the operation resource) with each other. Further, the integrated computing unit 111 serving as the operation resource which each core 112 shares with each other includes a plurality of computing units (0, 1, . . . ) 1111, a register file 1112, and a rename/allocate section 1113.

In this computer, eight general purpose registers (R0, R1, . . . , R7) of 32 bits are specified as the instruction set architecture. Further, this computer supports the register renaming function, and holds 128 physical registers (R100, R102, . . . , R227) in the register file 1112. Further, what realizes the register renaming function of dynamically allocating general purpose registers to physical registers in the register file 1112 is the rename/allocate section 1113. The rename/allocate section 1113 is also provided with an allocation function of securing physical registers to which general purpose registers are not allocated yet in the register file 1112 in accordance with a request from each core 112. The use of this allocation function will be described later. Further, the plural cores 112 share the register file 1112 with each other, thereby making an occurrence of shortage of registers at the time of register renaming hardly tend to take place, and avoiding lowering (for example, a state where an operation has to be performed through the main memory 13) of the performance resulting from shortage of registers.

On the other hand, each core 112 that shares the integrated computing unit 111 which is the operation resource with each other is provided with a virtual register conversion table 1121, primary data cache 1122, instruction decoder 1123, and primary instruction cache 1124. Of these, the virtual register conversion table 1121 has a configuration characteristic of the multi-core processor 11 of this computer, and an example of a configuration of the virtual register conversion table 1121 is shown in FIG. 3.

Figure 3:
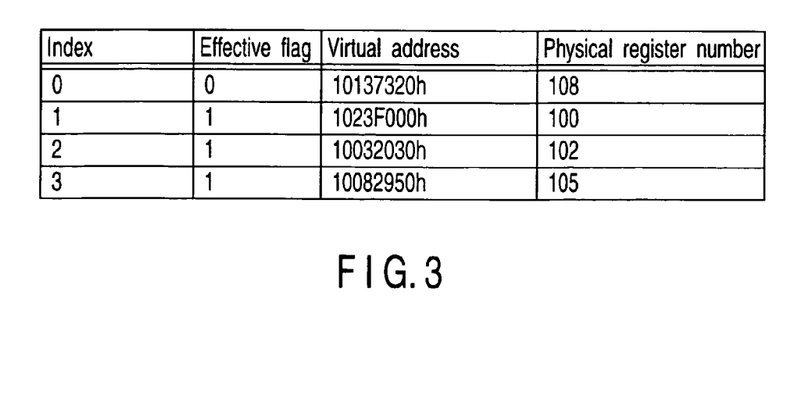
FIG. 3 is an exemplary view showing a configuration of a virtual register conversion table with which each of the cores of the multi-core processor to be incorporated in the computer of the first embodiment is provided.

As shown in FIG. 3, the virtual register conversion table 1121 has four fields of "index", "effective flag", "virtual address", and "physical register number", and the correspondence between each of virtual addresses in the main memory space and a corresponding one of physical register numbers (100 to 227) is recorded therein. That is, in this computer, the virtual register conversion table 1121 is provided, whereby it is made possible to use a physical register in the register file 1112 as a data cache. For example, it is assumed here that access to a virtual address "10032030h" has occurred. Then, the virtual address is recorded in the index "2", and hence the core 112 executes access to the physical register of the physical register number "102" in the register file 1112 in place of access to the primary data cache 1122, secondary cache 113, or the main memory 13 through the bus controller 114. The allocation function of the rename/allocate section 1113 described previously is used to secure a physical register in the register file 1112 to be associated with the virtual address.

A physical register to which a general purpose register is not yet allocated is turned into a mere surplus resource. Further, as compared with the memory access, the register access is performed at remarkably high speed. Accordingly, by replacing the memory access with the register access, both the effective utilization of the resource and the improvement in the performance of the processor can be realized. The fundamental principle by which each core 112 replaces the memory access with the register access with respect to the access to the virtual address by using the virtual register conversion table 1121 will be described below in detail.

Figure 4:
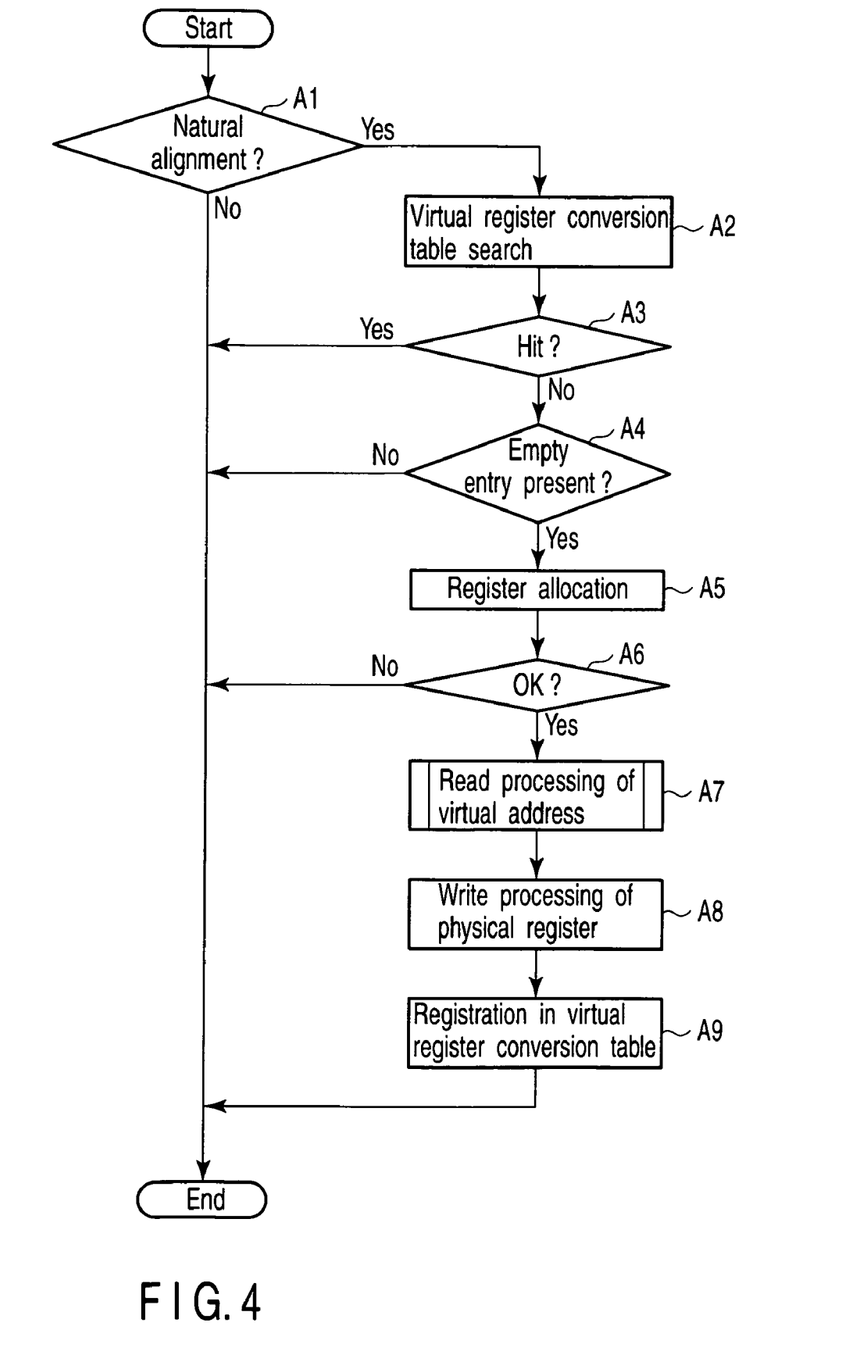
FIG. 4 is an exemplary flowchart showing procedures to be performed when the computer of the first embodiment assigns a virtual address to a physical register in a register file.

The correspondence between each of the virtual addresses and a corresponding one of the physical register numbers is recorded in the virtual register conversion table 1121 in accordance with a request from the program. FIG. 4 is an exemplary flowchart showing the procedures to be performed when a virtual address is assigned to a physical register in the register file 1112.

Upon receipt of a request to assign a certain virtual address to a physical register in the register file 1112 from the program, the core 112 first confirms whether or not the virtual address is of natural alignment (block A1). The natural alignment implies that the address is a multiple of a size of data to be stored. In this computer, data of 32 bits having the same size as the general purpose register, and hence it is confirmed that the virtual address is a multiple of 4.

When it has been confirmed that the virtual address is of the natural alignment (YES in block A1), the core 112 checks whether or not the virtual address is included in the virtual register conversion table 1121, i.e., whether or not the virtual address has already been assigned to a certain physical register (blocks A2 and A3). If the virtual address is not included in the virtual register conversion table 1121 (NO in block A3), then it is subsequently checked whether or not an empty entry is present in the virtual register conversion table 1121 (block A4).

If an empty entry is present in the virtual register conversion table 1121 (YES in block A4), then the core 112 requests the rename/allocate section 1113 to allocate the entry to a physical register in the register file 1112 (block A5). If the allocation is successful (YES in block A6), the read processing of the virtual address is executed on a memory access basis (block A7), and the write processing of data obtained by the memory access is executed on the basis of register access to the allocated physical register in the register file 1112 (block A8). Further, when the data copy is completed, the core 112 records the virtual address and a physical register number of the allocated physical register in the register file 1112 in the empty entry of the virtual register conversion table 1121, and sets the effective flag of the entry effective (block A9).

Figure 5:
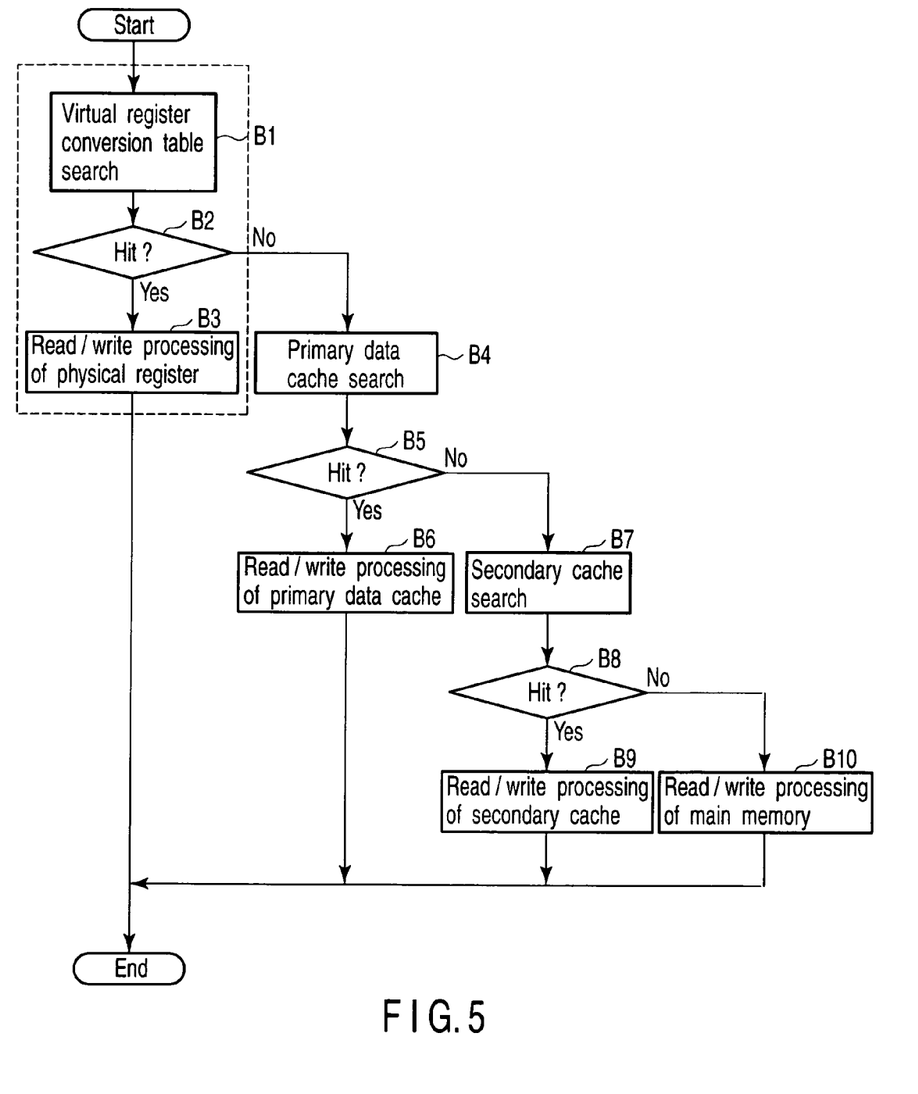
FIG. 5 is an exemplary flowchart showing procedures to be performed when the computer of the first embodiment performs a read operation or a write operation with respect to a virtual address.

FIG. 5 is an exemplary flowchart showing procedures to be performed when read processing or write processing is executed with respect to a virtual address.

When access to a certain virtual address occurs, the core 112 first checks whether or not the virtual address to be accessed is included in the virtual register conversion table 1121 (blocks B1 and B2). If the virtual address is included in the virtual register conversion table 1121 (YES in block B2), then the core 112 executes read/write processing with respect to a physical register having a physical register number obtained from the virtual register conversion table 1121 (block B3).

Incidentally, if the virtual address to be accessed is not included in the virtual register conversion table 1121 (NO in block B2), then the core 112 executes general virtual address read/write processing with respect to the main memory 13 through the primary data cache 1122, secondary cache 113, or bus controller 114 (blocks B4 to B10).

Figure 6:
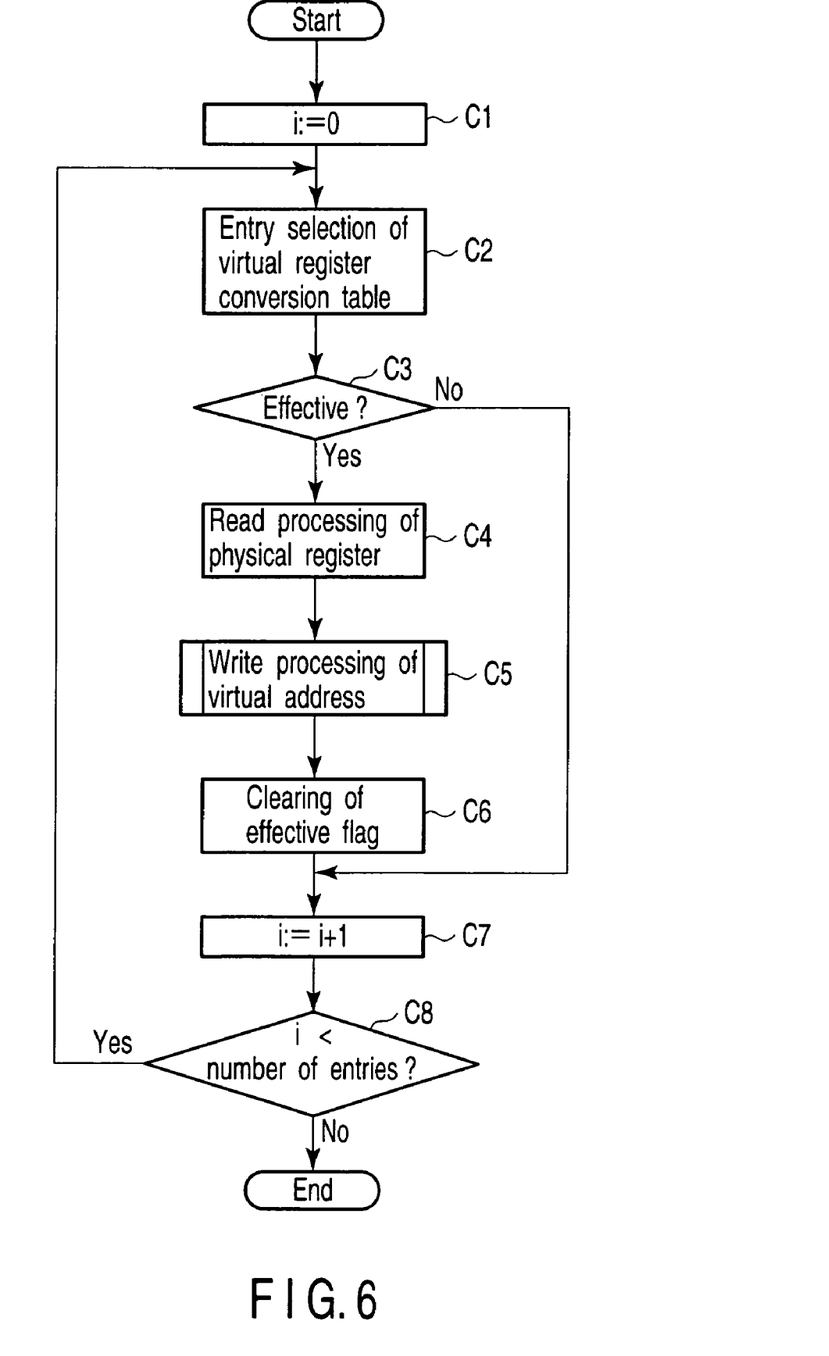
FIG. 6 is an exemplary flowchart showing procedures to be performed when the computer of the first embodiment flashes the assignment of the virtual address to the physical register in the register file.

FIG. 6 is an exemplary flowchart showing procedures to be performed when the assignment of the virtual address to the physical register in the register file 1112 is flashed.

When a change in the page table occurs, or when a request to flash the assignment is explicitly received from the program, the core 112 first initializes a counter for selecting an entry of the virtual register conversion table 1121 (block C1). Then, the core 112 selects an entry of the virtual register conversion table 1121 by using the counter (block C2), and checks whether or not the effective flag of the selected entry is effective (block C3).

If the effective flag is effective (YES in block C3), the core 112 executes read processing of a physical register in the register file 1112 corresponding to a physical register number recorded in the entry (block C4). Further, the core 112 executes write processing of writing the read data to a virtual address recorded in the entry (block C5), and clears the effective flag of the entry (block C6).

The core 112 updates the counter for selecting the entry of the virtual register conversion table 1121 (block C7). If the value of the counter obtained after the update has reached the number of entries of the virtual register conversion table 1121 (NO in block C8), the processing is terminated.

As described above, this computer is provided with a contrivance for replacing the processing of accessing a memory with the processing of accessing a physical register, thereby realizing effective utilization of the resource, and improvement in the performance of the processor. Further, even if a processor having an enhanced operation resource, such as an increased number of physical registers held in the register file 1112 appears, the enhanced part of the operation resource is automatically utilized without any modification of the program.

Second Embodiment

Next, a second embodiment of the present invention will be described below.

Figure 7:
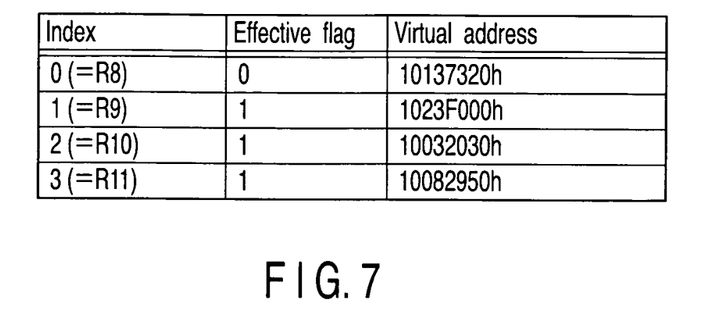
FIG. 7 is an exemplary view showing a configuration of a virtual register conversion table with which each of the cores of the multi-core processor to be incorporated in a computer of a second embodiment is provided.

FIG. 7 shows an exemplary configuration of a virtual register conversion table 1121 used in this embodiment. In the first embodiment described previously, as the information on the physical register in the register file 1112 to be assigned to the virtual address, the physical register number is recorded. However, in this embodiment, a virtual general purpose register number is used in place of the physical register number.

As described previously, in this computer, eight general purpose registers (R0, R1, . . . , R7) of 32 bits are specified as the instruction set architecture. Thus, when it is assumed that the number of entries of the virtual register conversion table 1121 is four, general purpose registers R8 to R11 are virtually specified outside the instruction set architecture in addition to the general purpose registers R0 to R7, and indices of the virtual register conversion table 1112 are regarded as the virtual general purpose registers R8 to R11.

Figure 8:
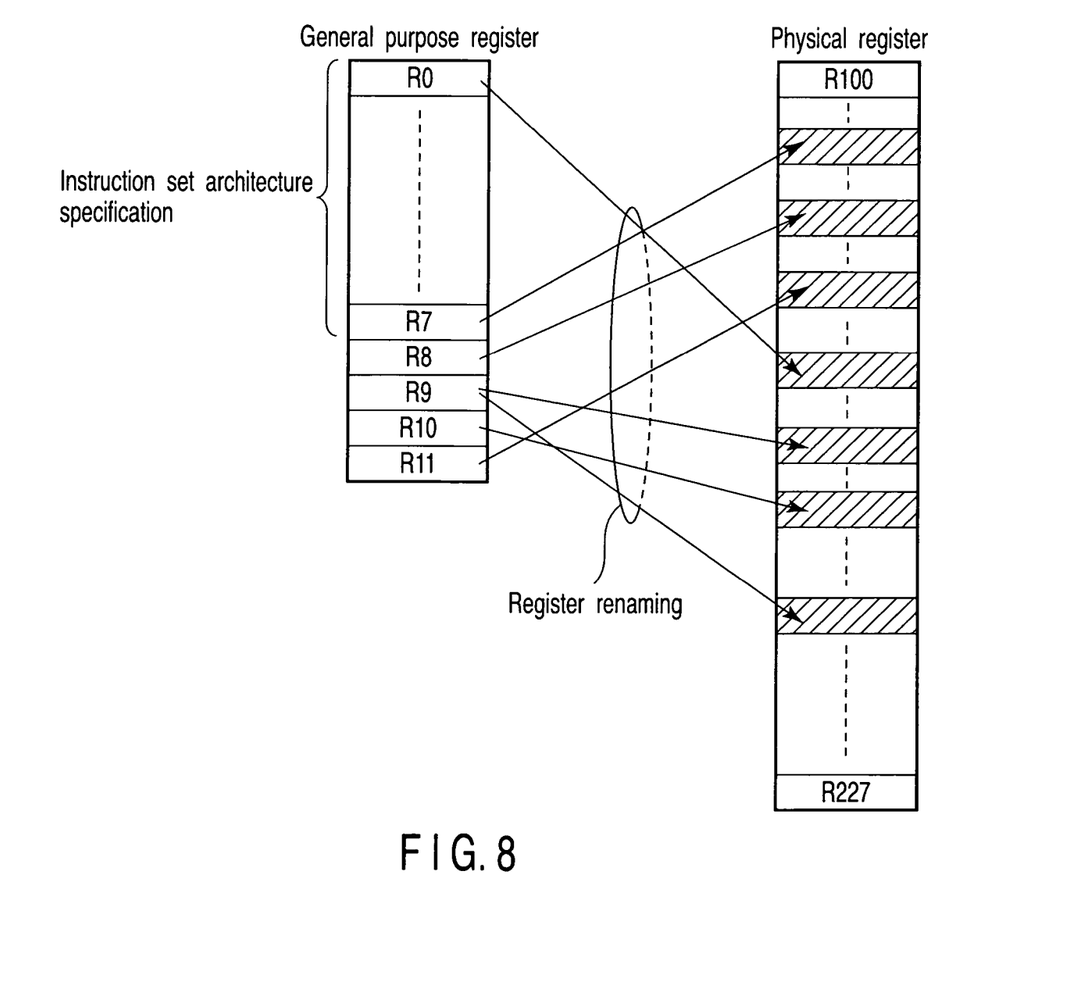
FIG. 8 is an exemplary view showing a state where the computer of the second embodiment assigns a virtual general purpose register to a physical register in a register file by register renaming.

By doing so, it is firstly possible to make even the virtual general purpose registers (R8 to R11) the processing object of the register renaming function to be carried out by a rename/allocate section 1113, and improve the performance as shown in FIG. 8.

Further, secondly, the indices of the virtual register conversion table 1121 correspond to the general purpose register numbers of the virtual registers on a one-to-one basis. Thus, by increasing the number of indices of the virtual register conversion table 1121, it becomes possible to expand the substantial number of the general purpose registers without changing the instruction set architecture.

Third Embodiment

Next, a third embodiment of the present invention will be described below.

In the first and second embodiments described previously, in each core 112, at a point of time at which task switching occurs, the processing of replacing the memory access with the register access is canceled and, thereafter even when the task is resumed, the performance is not improved.

Figure 9:
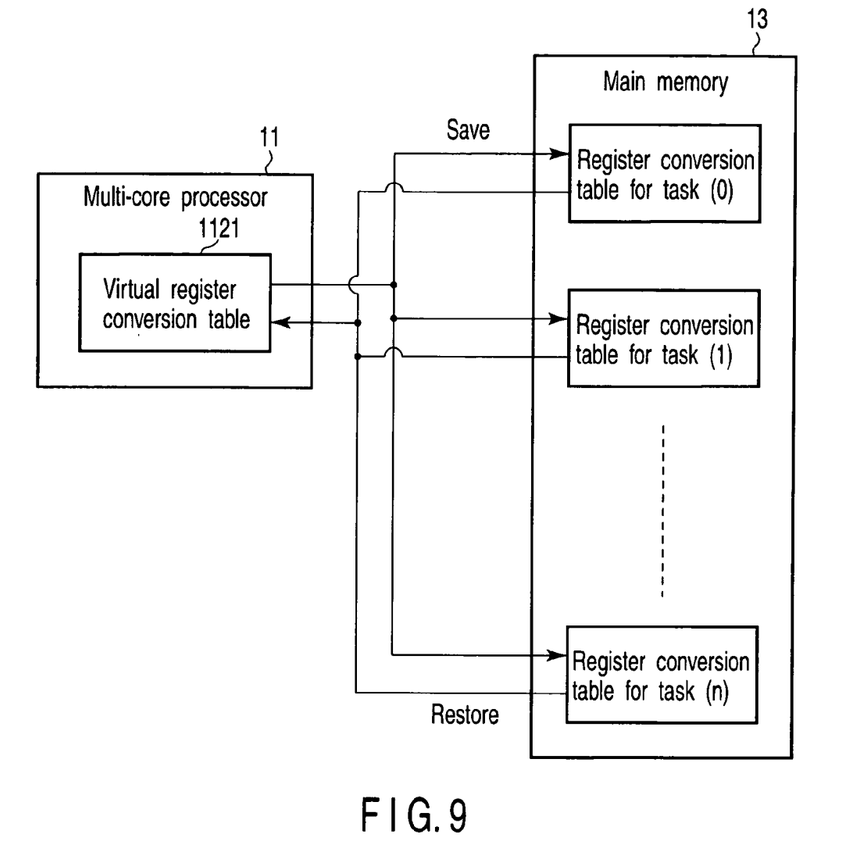
FIG. 9 is an exemplary view showing a state where a computer of a third embodiment switches the contents of a virtual register conversion table at the time of task switching.

Thus, in a computer of this embodiment, when the OS 100 makes a dispatcher 101 cause task switching, the contents of a virtual register conversion table 1121 of the core 112 is saved in a main memory 13 as shown in FIG. 9 and, when the task is resumed, processing is performed such that the saved contents are restored to the virtual register conversion table 1121, thereby making it possible to maintain improvement in the performance.

Figure 10:
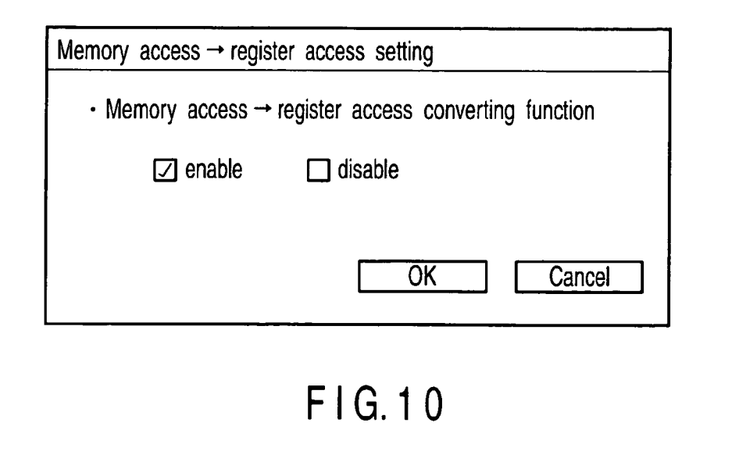
FIG. 10 is an exemplary view showing an example of a screen to be presented to a user by the computer of each of the first to third embodiments so as to cause the user to set whether or not a function of replacing memory access with register access is to be operated.

It should be noted that, in each of the embodiments described previously, an example in which the performance of the processor is improved by using a physical register in the register file 1112 as a data cache has been explained. In order to reliably prevent exhaustion of the resource such as shortage of registers at the time of register renaming undesirably caused by the above-mentioned situation, a contrivance for causing the user to perform setting so as to determine whether or not the function of replacing the memory access with the register access is to be carried out may be provided. For example, the setup program 150 described previously for performing operating environment setting of the computer is provided with a function of presenting the screen shown in FIG. 10 to the user, and each core 112 determines whether or not the function of replacing the memory access with the register access is to be carried out in accordance with the setting on the screen.

In the case where the setting is so made as not to allow the function of replacing the memory access with the register access to be carried out, when a request to assign a certain virtual address to a physical register in the register file 1112 is received from the program, even if this request is ignored, data access is performed as memory access without causing any contradiction in terms of the contents, thereby causing no problem.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising a processor, the processor comprising:
    a register file configured to hold physical registers to which general purpose registers are assigned, the general purpose registers being provided by an instruction set architecture;
    a virtual register assigning unit configured to assign a virtual address in the main memory space to a physical register in the register file based on a request from a program, and to record a correspondence between the virtual address and the assigned physical register in a virtual register conversion table;
    an access converting unit configured to determine whether or not a virtual address to be accessed is recorded in the virtual register conversion table managed by the virtual register assigning unit, and to execute, when the virtual address is recorded therein, processing of accessing the assigned physical register that is recorded in the virtual register conversion table; and
    a virtual register flashing unit configured to read, when task switching occurs on the processor, data from a physical register recorded in the virtual register conversion table, and to write the read data at the virtual address corresponding to the physical register.

2. The information processing apparatus according to claim 1,
    wherein the processor further comprises a register renaming unit configured to dynamically control assignment of a general purpose register to a physical register in the register file, and
    wherein the virtual register assigning unit of the processor is configured to assign a virtual address to a general purpose register virtually provided outside the instruction set architecture, to record a correspondence between the virtual address and the virtually provided general purpose register in the virtual register conversion table, and to cause the register renaming unit to execute assignment of a virtual address to a physical register in the register file through the intervention of the virtually defined general purpose register.

3. The information processing apparatus according to claim 1, further comprising:
    a memory; and
    a switching unit configured to save, when task switching occurs on the processor, the contents of the virtual register conversion table used in access processing by a task before the task switching occurs in the memory, and to restore the contents of the virtual register conversion table that have been saved in the memory onto the virtual register conversion table to be used in access processing by a task after the occurrence of the task switching.

4. The information processing apparatus according to claim 1, wherein the processor further comprises a plurality of instruction processing units, and the plurality of instruction processing units share the register file.

5. The information processing apparatus according to claim 1, further comprising a setting unit configured to set one or more indicators to mark whether or not the register assigning unit and the access converting unit are operational.

6. A data access control method of an information processing apparatus comprising a processor that comprises a register file which holds physical registers to which general purpose registers are assigned, the general purpose registers being provided by an instruction set architecture, the method comprising:
    assigning a virtual address in the main memory space to a physical register in the register file based on a request from a program, and recording a correspondence between the virtual address and the assigned physical register in a virtual register conversion table;
    determining whether or not a virtual address to be accessed is recorded in the virtual register conversion table, and executing, when the virtual address is recorded therein, processing of accessing the assigned physical register that is recorded in the virtual register conversion table; and
    reading, when task switching occurs on the processor, data from a physical register recorded in the virtual register conversion table, and writing the read data to the virtual address corresponding to the physical register that is recorded in the virtual register conversion table.

7. The data access control method according to claim 6, wherein the processor further comprises a register renaming unit configured to dynamically control assignment of a general purpose register to a physical register in the register file,
    wherein assigning a virtual address to a physical register comprises assigning a virtual address to a general purpose register virtually provided outside the instruction set architecture, recording a correspondence between the virtual address and the virtually provided general purpose register in the virtual register conversion table, and causing the register renaming unit to execute assignment of a virtual address to a physical register in the register file through the intervention of the virtually defined general purpose register.

8. The data access control method according to claim 6, further comprising saving, when task switching occurs on the processor, the contents of the virtual register conversion table used in access processing by a task before the task switching occurs in the memory, and restoring the contents of the virtual register conversion table that have been saved in the memory to the virtual register conversion table to be used in access processing by a task after the occurrence of the task switching.

9. The data access control method according to claim 6, further comprising setting one or more indicators to mark whether or not management of the virtual register conversion table and processing of accessing the physical register based on the virtual register conversion table are operational.

* * * * *